United States Patent [19]

Inoue

[11] 4,409,458
[45] Oct. 11, 1983

[54] EDM METHOD AND APPARATUS WITH THE CONTROLLED SUPPLY OF A LIQUID MACHINING MEDIUM INTO THE GAP

[75] Inventor: Kiyoshi Inoue, Tokyo, Japan

[73] Assignee: Inoue-Japax Research Incorporated, Yokohama, Japan

[21] Appl. No.: 254,093

[22] Filed: Apr. 14, 1981

[30] Foreign Application Priority Data

Apr. 17, 1980 [JP] Japan .................................. 55-51335
Apr. 21, 1980 [JP] Japan .................................. 55-52699

[51] Int. Cl.³ ............................................. B23P 1/08
[52] U.S. Cl. .............................. 219/69 D; 219/69 M; 219/69 V; 204/129.6; 204/129.7
[58] Field of Search ................ 219/69 R, 69 V, 69 D, 219/69 C, 69 G; 204/129.2, 129.6, 129.7

[56] References Cited

U.S. PATENT DOCUMENTS 3,699,303  10/1972  Kauffman et al. ............... 219/69 D
3,975,607   8/1976  Ullmann et al. .................. 219/69 D
4,205,213   5/1980  Inoue ................................ 219/69 M
4,208,256   6/1980  Inoue ................................ 219/69 D

FOREIGN PATENT DOCUMENTS 2904797  8/1979  Fed. Rep. of Germany ... 219/69 D

*Primary Examiner*—M. H. Paschall
*Attorney, Agent, or Firm*—Karl F. Ross; Herbert Dubno

[57] ABSTRACT

An machining method and apparatus whereby the EDM efficiency is markedly enhanced by replenishing the liquid machining medium in the machining gap at an amount of 400 to 3000 cc per unit weight by gram of the stock removal from the workpiece. The machining liquid is supplied into the gap under an elevated pressure of at least 10 kg/cm², preferably between 30 and 100 kg/cm². The rate of flow of the liquid medium to the gap is controlled in conjunction with and/or in response to at least one of the preset or variable parameters of the electrical discharges and/or as a function of other machining parameters such as the depth of the machining cavity so as to maintain the indicated amount of liquid replenishment.

21 Claims, 3 Drawing Figures

EDM METHOD AND APPARATUS WITH THE CONTROLLED SUPPLY OF A LIQUID MACHINING MEDIUM INTO THE GAP

FIELD OF THE INVENTION

The present invention relates to electrical discharge machining (EDM) in general. More particularly, the invention relates to an improved method of machining an electrically conductive workpiece by effecting a succession of time-spaced, discrete and localized electrical discharges between the workpiece and a tool electrode spacedly juxtaposed therewith across a machining gap supplied with a liquid machining medium to electroerosively remove stock from the workpiece.

BACKGROUND OF THE INVENTION

The liquid machining medium supplied to the EDM gap is typically a liquid hydrocarbon such as kerosine or a conductivity-adjusted water liquid. It serves to envelope, compress and cool the discharge column. By causing a discharge column to be squeezed to a greater extent by the liquid environment, it is possible to increase the discharge current density and discharge energy density, and to augment the discharge pressure, thereby increasing the impulsive pulverization and scattering of molten metal at the discharge spot and metal vapors in the discharge column. The EDM liquid machining medium also serves to cool these discharge scattered products and thereby to solidify them into particulate objects which are commonly called EDM chips. The EDM liquid machining medium further serves to carry away the discharge products and EDM chips from the discharge site. Thus, a portion of the liquid medium is decomposed and evaporated to produce a gaseous expansion pressure which facilitates removal of the machining products from the region of the machining gap between the tool electrode and the workpiece.

I have discovered that upon extinction of one given electrical discharge, a portion of the discharge-generated gases and vapors should desirably remain in the gap region to facilitate triggering of a next discharge. Thus, a succession of outstandingly effective electrical discharges will be created across the machining gap between the tool electrode and the workpiece if an appropriate amount of these gases and vapors is kept in existence in the gap. An excessive amount of the gases and vapors will be undesirable because the discharges tend to be converted into a continuous arc discharge which brings about damage of the workpiece, the tool electrode or both. At the same time, the cooling action will be substantially deteriorated. On the other hand, instability in discharge production or a reduced rate of repetition of electrical discharges is attributed to an insufficient proportion of the discharge-generated gases and vapors.

OBJECTS OF THE INVENTION

It is the principal object of the invention to provide a novel EDM method which gives an enhanced machining efficiency of a level which has never been attained heretofore.

A specific object of the invention is to provide an EDM method which affords a removal rate five or ten times or even more times greater than the removal rate which has been possible with the prior art.

Another object of the invention is to provide a EDM apparatus for carrying out the improved method.

SUMMARY OF THE INVENTION

As noted in the foregoing, it has now been found to be important that an optimum amount of discharge-generated gases and vapors (hereinafter referred to "discharge gases") remain existent in the machining gap. Experimentation has shown that the amount of the discharge gases produced per unit discharge energy is given by $2 \times 10^{-2}$ cm$^3$/J with kerosine or like hydrocarbons used as the liquid machining medium and $3 \times 10^{-3}$ cm$^3$/J with a water liquid used as the machining medium. On the other hand it has been determined that the EDM stock removal by weight per unit discharge energy is given by 10 to $30 \times 10^{-6}$ gr/J with a hydrocarbon liquid and 4 to $9 \times 10^{-6}$ gr/J with a water liquid.

I have now discovered that a highly satisfactory gap condition is established in which an optimum amount of the discharge gases remains existent in the gap when the amount of the liquid machining medium supplied to the machining gap is strictly controlled at a value of 400 to 3000 cc/gr calculated per unit weight of EDM stock removal from the workpiece and, specifically at 700 to 3000 cc/gr with a hydrocarbon liquid machining medium and at 400 to 1000 cc/gr with a water liquid machining medium.

In accordance with the present invention, there is thus provided an improved method of machining an electrically conductive workpiece by effecting a succession of electrical discharges between the workpiece and a tool electrode juxtaposed therewith across a machining gap supplied with a liquid machining medium to electroerosively remove stock from the workpiece, which method comprises: replenishing the liquid machining medium fed into the machining gap at an amount of 400 to 3000 cc per unit weight by gram of the stock removal from the workpiece. Specifically, the amount should range between 700 to 3000 cc when the liquid machining medium is a hydrocarbon liquid, e.g. kerosine, and should range between 400 and 1000 cc when the liquid machining medium is a water liquid, say having a specific resistivity of $10^3$ to $10^5$ ohm-cm.

The invention also provides an apparatus for machining an electrically conductive workpiece with a tool electrode, which apparatus comprises: power supply means for effecting a succession of electrical discharges between the tool electrode and the workpiece across a machining gap in the presence of a liquid machining medium to electroerosively remove stock from the workpiece; liquid supply means for supplying the machining gap with the liquid machining medium; and means associated with the power supply means and liquid supply means for regulating the rate of supply of the liquid machining medium into the gap so that the said medium is replenished into the gap at an amount of 400 to 3000 cc per unit weight by gram of the stock removal from the workpiece. The apparatus may further include means for imparting to the tool electrode mechanical vibrations of a frequency between 1 kHz and 10 MHz to facilitate passage of the liquid machining medium into and through the machining gap. The liquid supply means is preferably adapted to supply to the machining gap the liquid machining medium under a pressure of at least 10 kg/cm$^2$, preferably between 30 and 100 kg/cm$^2$.

BRIEF DESCRIPTION OF DRAWING

These and other objects, features and advantages of the present invention will become more readily apparent from the following description as taken with reference to the accompanying drawing in which.

SPECIFIC DESCRIPTION

Figure 1:
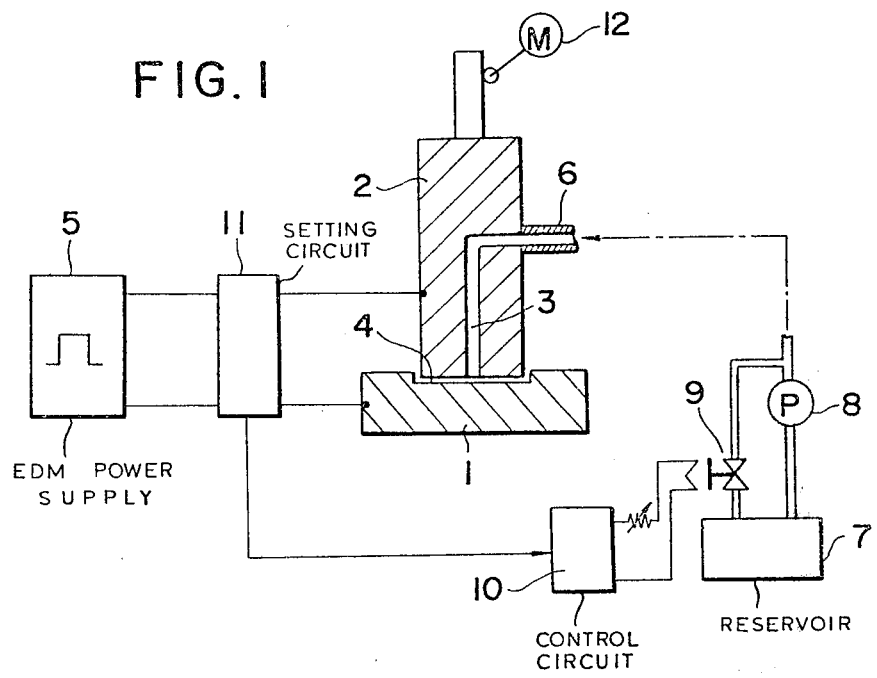
FIG. 1 is a schematic view partly in section diagrammtically illustrating a typical EDM arrangement with means for controlling the rate of flow of a liquid machining medium into the EDM gap in accordance with the principles of the present invention.

In FIG. 1 there is shown a typical sinking-type EDM arrangement for machining an electrically conductive workpiece 1. The arrangement includes a tool electrode 2 formed with an internal bore or fluid passage 3 and spacedly juxtaposed with the workpiece 1 across a small gap spacing 4 to which the bore 3 is open and into which a liquid machining medium is supplied through the fluid passage 3. An EDM power supply 5 is electrically connected to the workpiece 1 and the tool electrode 2 to furnish a succession of electroerosive power pulses across the machining gap to remove stock from the workpiece 1. The fluid passage 3 in the tool electrode 2 communicates via a fluid inlet 6 thereto with a reservoir 7 for the liquid machining medium. A pump 8 draws the liquid machining medium from the reservoir 7 and pumps and delivers it under an elevated pressure into the machining gap 4 through the inlet 6 and the passage 3. A portion of the liquid machining medium drawn by the pump 8 is returned to the reservoir 7 via a relief valve 9 which is of electromagnetic type and controlled by a control circuit 10 to regulate the amount or rate of flow of the liquid machining medium flowing into the machining gap 4. The control circuit 10 for the valve 9 has a plurality of settings ganged with the settings established in a setting circuit 11 for the EDM power supply 5 with respect to the frequency or the mean machining current, the power, the pulse on-time $\tau$on and/or the peak current Ip of the EDM power pulses. When one particular such setting is established at the setting circuit 11 for the EDM power supply 5, the corresponding setting is established in the control circuit 10 for the valve 9 to determine the corresponding rate of flow of the liquid machining medium into the machining gap 4 so that the replenishment of the liquid medium into the gap 4 is held at a constant amount, viz. 400 to 3000 cc, in accordance with the present invention, per unit weight, viz. by gram, of the EDM stock removal from the workpiece 1. The circuit 11 may alternatively be constituted as a sensing circuit for sensing the frequency, mean machining current or power of actual EDM pulses and may act on the control circuit 10 to controlledly change the rate of flow of the liquid machining medium into the gap 4. As the stock removal proceeds, the tool electrode 2 is advanced progressively into the workpiece 1 by means of a servocontrol device 12 designed to maintain the size of the machining gap 4 substantially constant. The electrode advance or feed is continued until a cavity of a desired depth is achieved.

The machining liquid is advantageously constituted by deionized water liquid having a specific resistivity in the range between $10^3$ and $10^5$ ohm-cm. The use of a water liquid which is incombustible allows the tool electrode 2 and the workpiece 1 forming the machining gap conveniently to be exposed to the air, although they may be immersed in the water liquid. When a hydrocarbon liquid such as kerosine which in contact with the air is inflammable by electrical discharges is used, at least the region of the machining gap between the tool electrode 2 and the workpiece 1 should be immersed therein to a sufficient depth in a usual manner.

The rate of flow, that is replenishment, of the liquid machining medium is, in accordance with the present invention, regulated by the valve control circuit 10, in conjunction with the output characteristic of the power supply 5 set or ascertain at the circuit 11 which affords stock removal, to be strictly a value which gives a constant amount in the range between 400 to 3000 cc of replenishment of the liquid machining medium into the gap 4 per unit weight by gram of the stock removal from the workpiece 1. This constant amount specifically should be in a range between 700 and 3000 cc/gr with the hydrocarbon liquid such as kerosine and in a range between 400 to and 1000 cc/gr with a water liquid as described previously. The output characteristic of the power supply 5 to be set or ascertained at the circuit 10 may as noted above be the frequency or mean machining current, the power, the pulse duration $\tau$on and/or the peak current Ip of the EDM pulses.

By holding the liquid machining medium to be replenished at such an optimum amount to the machining gap 4, the cooling action thereof for the discharge column and the discharge molten products with each discharge pulse is optimized to raise the discharge machining performance. The discharge gases remain existent in an optimum amount in the machining gap 4 to facilitate production of individual discharges yet with a uniform triggering characteristic, thereby permitting the repetition of machining discharges to be increased in rate and to occur with an equalized stock removal characteristic.

An increase in the discharge repetition rate which represents an increase in removal rate is dictated by the circuit 11 when constructed as the frequency sensing circuit which then acts on the control circuit 10 for controlling the valve 10 to increase the rate of flow of the liquid machining medium into the machining gap to such a precise extent that its predetermined amount per unit weight of the stock removal from the workpiece 1 remains constant. For the same purposes, the circuit may also be constructed as a sensing circuit for sensing the mean machining current or power delivered through the machining current. An increase in the mean machining current or power represents an increase in the removal rate, too. The control should continue until a maximum removal rate is achieved.

EXAMPLE I

A ferrous workpiece is EDM-drilled with a cylindrical tubular copper electrode having an outer diameter of 0.3 mm and an inner diameter of 0.18 mm. The liquid machining medium is a deionized water liquid having a specific resistivity of $10^4$ ohm-cm. The EDM power pulses have a peak current Ip of 10 amperes, a pulse on-time $\tau$on of 6 microseconds and a pulse off-time $\tau$off of 2 microseconds. When the rate of flow or replenishment of the liquid machining medium into the gap is maintained at 6 to 10 cc/min, the electrode feed rate is as high as 30 mm/min. For comparison, when the liquid flow into the gap is at a rate of 2 to 3 cc/min, the electrode feed rate is as low as 3 to 5 mm/min. When the liquid flow into the gap is at a rate of 15 to 20 cc/min, the electrode feed rate is 6 to 8 mm/min. It is seen that a removal rate five to ten times greater is obtained according to the invention.

It is found to be sometimes desirable to furnish the liquid machining medium in an amount of 400 to 3000 cc per unit weight by gram of the stock removal intermittently or pulsively. Thus, the liquid machining medium may be supplied intermittently or pulsively in a succession of cycles with a quantity and rate of supply corresponding to 400 to 3000 cc per unit weight by gram of the stock removal. Each cycle furnishes a quantity of the liquid machining medium corresponding to the aforementioned amount per unit weight of the stock removal to be achieved during the cycle. In a deep-hole drilling or cavity-sinking operation wherein the removal of the gap products from the gap region becomes progressively difficult and the rate of repetition of actual discharges progressively lowers, the rate of flow of the liquid machining medium is increased to maintain the constancy of the liquid replenishment per unit weight of the stock removal.

Sometimes it is desirable to impart to the tool electrode 2 high-frequency vibrations of a frequency between 1 kHz and 10 MHz and with an amplitude up to, say, 50 micrometers to facilitate the passage of the liquid machining medium into and through the machining gap 4.

It has also been found to be desirable to supply into the machining gap the liquid machining medium pressurized upwards of 10 kg/cm$^2$ and preferably between 30 and 100 kg/cm$^2$. It has been determined that each electrical discharge in the EDM process gives rise to an intense pressure which amounts to 100 to 150 kg/cm$^2$ or even higher in the region of the discharge column. In the machining gap it is thus seen that there develops a substantial pressure which may amount to 10 kg/cm$^2$ or even higher, say, than 50 kg/cm$^2$ or reaches 100 kg/cm$^2$ and this pressure impedes a controlled passage of the liquid machining medium into the machining gap. I have found that the desired replenishment of the liquid machining medium in an amount of 400 to 3000 cc per unit weight by gram of the stock removal is achieved when the liquid machining medium is forced to flow into the gap under an elevated pressure upwards of 10 kg/cm$^2$, preferably in excess of 30 kg/cm$^2$ and up to 100 kg/cm$^2$.

Figure 2:
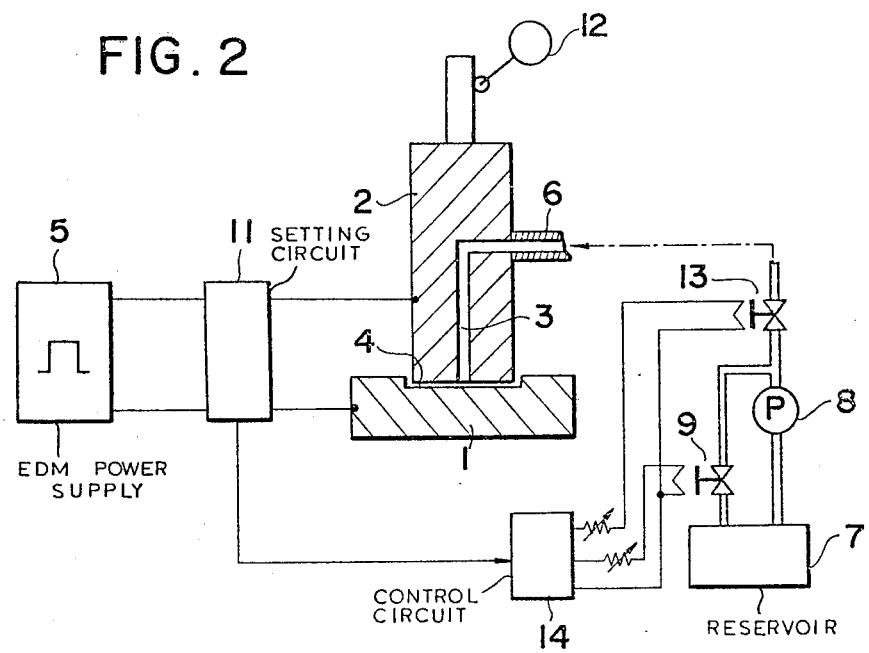
FIG. 2 is a similar view of the EDM arrangement further including means for controlling the pressure of the liquid machining medium flowing into the machining gap.

It has further been determined that the discharge pressure varies as a function of parameters of electrical discharge and, in particular, the duration or on-time $\tau on$ of the discharge pulses. It is therefore desirable to vary the delivery pressure of the liquid machining medium as a function of these parameters. The system of FIG. 2, in which the same reference numerals as those used in FIG. 1 designate the same or similar components, includes an arrangement whereby the delivery pressure of the liquid machining medium into the gap 4 is controlled as a function of the discharge parameters and, in particular, the pulse on-time $\tau on$. Thus, a valve 13 included in the fluid conduit between the pump 8 and the fluid inlet 6 to the tool electrode is of electromagnetic type and regulated by a modified control circuit 14. The latter here has both the settings for the valve 9 designed to regulate the rate of flow of the liquid machining medium into the gap 4 and the settings for the valve 13 designed to regulate the delivery pressure of the liquid machining medium into the gap 4. These two sets of the settings in the control circuit 14 are ganged with one or two sets of the settings in the parameter setting or monitoring circuit 11 for the EDM power supply 5.

EXAMPLE II

Figure 3:
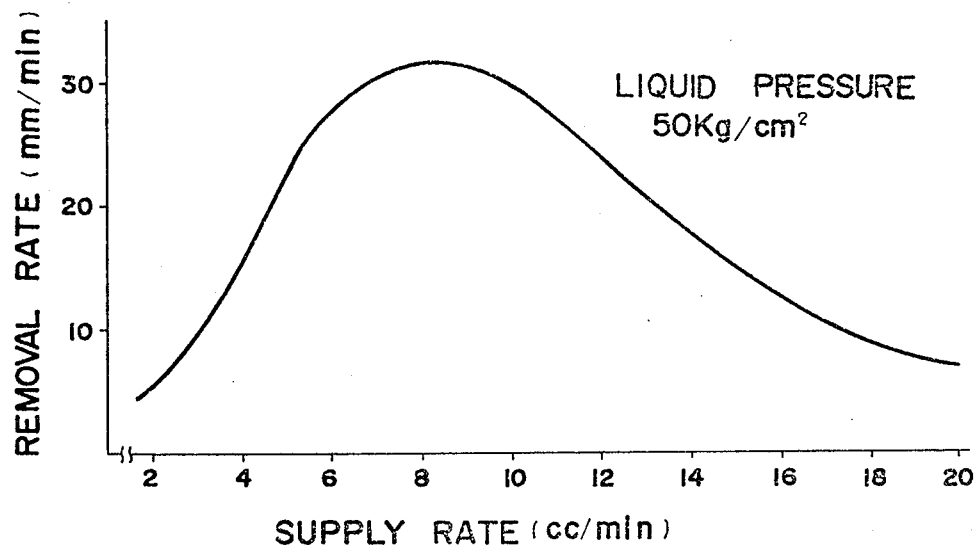
FIG. 3 is a graph showing a relationship between the rate of flow of the liquid machining medium into the machining gap and the removal rate with the pressure of the medium flowing into the gap held at a constant elevated pressure.

A ferrous workpiece is EDM-drilled with a cylindrical tubular copper electrode having an outer diameter of 0.3 mm and an inner diameter of 0.18 mm. The liquid machining medium is a deionized water liquid having a specific resistivity of $10^4$ ohm-cm. The EDM power pulses have a peak current Ip of 10 amperes, a pulse on-time $\tau on$ of 6 microseconds and a pulse off-time $\tau off$ of 2 microseconds. With the delivery pressure of the liquid machining medium into the EDM gap held at 50 kg/cm$^2$, the rate of supply of the liquid machining medium into the EDM gap is varied from 2 cc/min to 20 cc/min and the EDM removal rate in terms of the rate of electrode feed into the workpiece in mm/min is measured. The result is shown in the graph of FIG. 3 in which the abscissa represents the rate of supply of the liquid machining medium in cc/min and the ordinate represents the removal rate in mm/min. It is seen that a removal rate as high as 30 mm/min is obtained when the rate of supply falls between 6 to 10 cc/min. In this range, a maximum EDM performance is shown to have been realized in which the liquid machining medium is replenished in the gap 4 at an amount of 500 to 1000 cc per unit weight by gram of the stock removal from the workpiece, in accordance with the present invention.

It will be apparent that embodiments of the invention are applicable to practically any form of the EDM processes using any form of the tool electrode. Thus, the tool electrode may, instead of a block form as shown, be a wire, rod or pipe. A continuous wire electrode may be used in a conventional wire-cut EDM arrangement. The tool electrode may also be in the form of a rotary disk or pipe. The liquid machining medium may, instead of being supplied from the tool electrode or the workpiece through a fluid passage form therein, be furnished through one or more nozzles disposed in the proximity of the machining gap.

There is thus provided a novel and useful EDM method and apparatus, in accordance with the present invention, which gives a markedly enhanced machining efficiency over the prior art.

What is claimed is:

1. A method of machining an electrically conductive workpiece with a tool electrode spacedly juxtaposed therewith across a machining gap comprising the steps of:

supplying a liquid machining medium into said gap;
effecting a succession of electrical discharges between the tool electrode and the workpiece to electroerosively remove stock from the workpiece with said liquid medium in the machining gap being progressively contaminated with discharge products;
replenishing a predetermined amount in volume of said liquid machining medium into discharge sites of said machining gap to partially replace said contaminated liquid medium to produce such electrical discharges consecutively, and predetermining said amount in volume for each unit weight of said stock removed from the workpiece, said amount in volume per unit weight of stock removed ranging between 400 and 3000 cc/gr; and presetting the rate of flow of said liquid machining medium replenished into discharge sites of said machining gap in conjunction with at least one of the parameters of said electrical discharges determining the prescribed stock removal by weight per unit time, thereby presetting said amount in volume per unit weight.

2. A method of machining an electrically conductive workpiece with a tool electrode spacedly juxtaposed therewith across a machining gap, comprising the steps of:

supplying a liquid machining medium into said gap;

effecting a succession of electrical discharges between the tool electrode and the workpiece to electroerosively remove stock from the workpiece with said liquid medium in the machining gap being progressively contaminated with discharge products;

replenishing a predetermined amount in volume of said liquid machining medium into discharge sites of said machining gap to partially replace said contaminated liquid medium to produce such electrical discharges consecutively, and predetermining said amount in volume for each unit weight of said stock removed from the workpiece, said amount in volume per unit weight of stock removed ranging between 400 and 3000 cc/gr; and sensing at least one variable parameter of said electrical discharges determining the variable stock removal by weight per unit time to provide an output signal and, in response to said output signal, controlling the rate of flow of said liquid machining medium replenished into discharge sites of said machining gap in such a manner that said amount in volume per unit weight is maintained.

3. The method defined in claim 1 or claim 2 wherein said at least one parameter is the frequency of said electrical discharges.

4. The method of claim 1 or claim 2 wherein said parameter is the mean current of said electrical discharges.

5. The method defined in claim 1 or claim 2 wherein said at least one parameter is at least one of the duration and the peak current of said electrical discharges.

6. The method defined in claim 1 or claim 2 wherein said at least one parameter is the power of said electrical discharges.

7. A method of machining an electrically conductive workpiece with a tool electrode spacedly juxtaposed therewith across a machining gap, comprising the steps of:

supplying a liquid machining medium into said gap;

effecting a succession of electrical discharges between the tool electrode and the workpiece to electroerosively remove stock from the workpiece with said liquid medium in the machining gap being progressively contaminated with discharge products;

replenishing a predetermined amount in volume of said liquid machining medium into discharge sites of said machining gap to partially replace said contaminated liquid to produce such electrical discharges consecutively, and predetermining said amount in volume for each unit weight of stock removed from the workpiece, said amount in volume per unit weight of stock removed ranging between 400 and 3000 cc/gr; and controlling the rate of flow of said liquid machining medium replenished into discharge sites of said machining gap as a function of the depth of a cavity progressively machined in said workpiece in conjunction with the prescribed stock removal by weight per unit time.

8. A method of machining an electrically conductive workpiece with a tool electrode spacedly juxtaposed therewith across a machining gap, comprising the steps of:

supplying a liquid machining medium into said gap;

effecting a succession of electrical discharges between the tool electrode and the workpiece to electroerosively remove stock from the workpiece with said liquid medium in the machining gap being progressively contaminated with discharge products;

replenishing a predetermined amount in volume of said liquid machining medium into discharge sites of said machining gap to partially replace said contaminated liquid medium to produce such electrical discharges consecutively, and predetermining said amount in volume for each unit weight of said stock removed ranging between 400 and 3000 cc/gr, and imparting to said tool electrode vibrations of a frequency of 1 kHz to 10 MHz to facilitate passage of said liquid machining medium into and through said machining gap.

9. The method defined in claim 1, claim 2, claim 7 or claim 8 wherein said liquid machining medium is a water liquid and said amount in volume per weight ranges between 400 and 1000 cc/gr.

10. The method defined in claim 9 wherein said water liquid has a specific resistivity between $10^3$ and $10^5$ ohm-cm.

11. The method defined in claim 1, claim 2, claim 7 or claim 8 wherein said liquid machining medium is a hydrocarbon liquid and said amount in volume per weight ranges between 700 and 3000 cc/gr.

12. The method defined in claim 11 wherein said hydrocarbon liquid is kerosine.

13. The method defined in claim 1, claim 2, claim 7 or claim 8 wherein said liquid machining medium is replenished in a continuous flow into said machining gap.

14. The method defined in claim 1, claim 2, claim 7 or claim 8 wherein said liquid machining medium is replenished into said machining gap cyclically in a pulsed flow having a quantity of said liquid machining medium substantially corresponding to said amount in volume per unit weight times the prescribed stock removal by weight to be achieved during an individual cycle.

15. The method defined in claim 1, claim 2, claim 7 or claim 8, further comprising supplying into said machining gap said liquid machining medium under a pressure of at least 10 kg/cm$^2$.

16. The method defined in claim 15 wherein said pressure is between 30 and 100 kg/cm$^2$.

17. The method defined in claim 15, further comprising controlling said pressure of the liquid machining medium as a function of a parameter of said electrical discharges.

18. An apparatus for machining an electrically conductive workpiece with a tool electrode spacedly juxtaposed therewith across a machining gap, comprising:

liquid supply means for supplying a liquid machining medium into said machining gap;

power supply means for effecting a succession of electrical discharges between the tool electrode and the workpiece to electroerosively remove stock from the workpiece with said liquid medium into the machining gap being progressively contaminated with discharge products;

first setting means associated with said power supply means for presetting parameters of said electrical discharges; and flow regulation means operable to act on said liquid supply means for replenishing a predetermined amount in volume of said liquid machining into discharge sites of said machining gap to partially replace said contaminated liquid to produce such electrical discharges consecutively, said amount in volume being predetermined for each unit weight of said stock removal from the workpiece and ranging between 400 and 3000 cc/gr, said flow regulation means including second setting means associated with said first setting means for presetting the rate of flow of said liquid machining medium to be replenished into discharge sites of said machining gap in conjunction with at least one of said presettable parameters of the electrical discharges determining the prescribed stock removal by weight per unit time, thereby presetting said amount in volume per unit weight said flow regulation means also including means responsive to at least one variable parameter of said electrical discharges for modifying said rate of flow.

19. An apparatus for machining an electrically conductive workpiece with a tool elelctrode spacedly juxtaposed therewith across a machining gap, comprising:

liquid supply means for supplying a liquid machining medium into said machining gap;

power supply means for effecting a succession of electrical discharges between the tool electrode and the workpiece to electroerosively remove stock from the workpiece with said liquid medium in the machining gap being progressively contaminated with discharge products; and flow regulation means operable to act on said liquid supply means for replenishing a predetermined amount in volume of said liquid machining medium into discharge sites of said machining gap to partially replace said contaminated liquid to produce such electrical discharges consecutively, said amount in volume being predetermined for each unit weight of said stock removal from the workpiece and ranging between 400 and 3000 cc gr, said flow regulation means including means responsive to said machining gap for sensing at least one variable parameter of said electrical discharges determining the variable stock removal by weight per unit time and thereby controlling the rate of flow of said liquid machining medium replenished into discharge sites in said machining gap in such a manner that said amount in volume per unit weight is maintained.

20. The apparatus defined in claim 18 or claim 19, further comprising means for imparting to said tool electrode mechanical vibrations of a frequency between 1 kHz and 10 MHz to facilitate passage of said liquid machining medium into and through said machining gap.

21. The apparatus defined in claim 18 or claim 19 wherein said liquid supply means includes pumping means for delivery into said machining gap said liquid machining medium under a pressure of at least 10 kg/cm$^2$.

* * * * *